(No Model.)
W. BRIERLEY.
CONFECTIONER'S KETTLE.
No. 484,134. Patented Oct. 11, 1892.
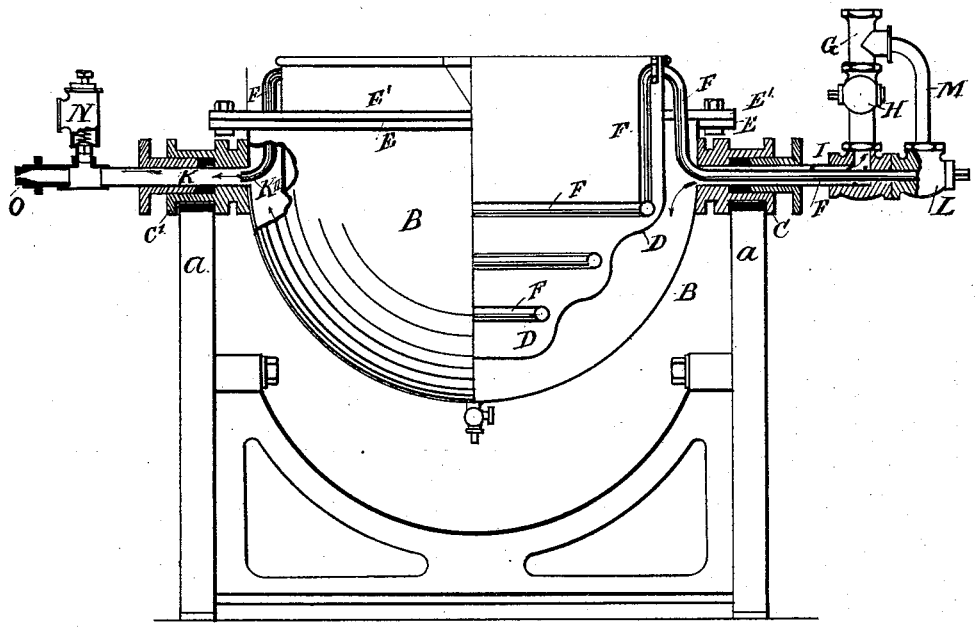
Fig. 1.
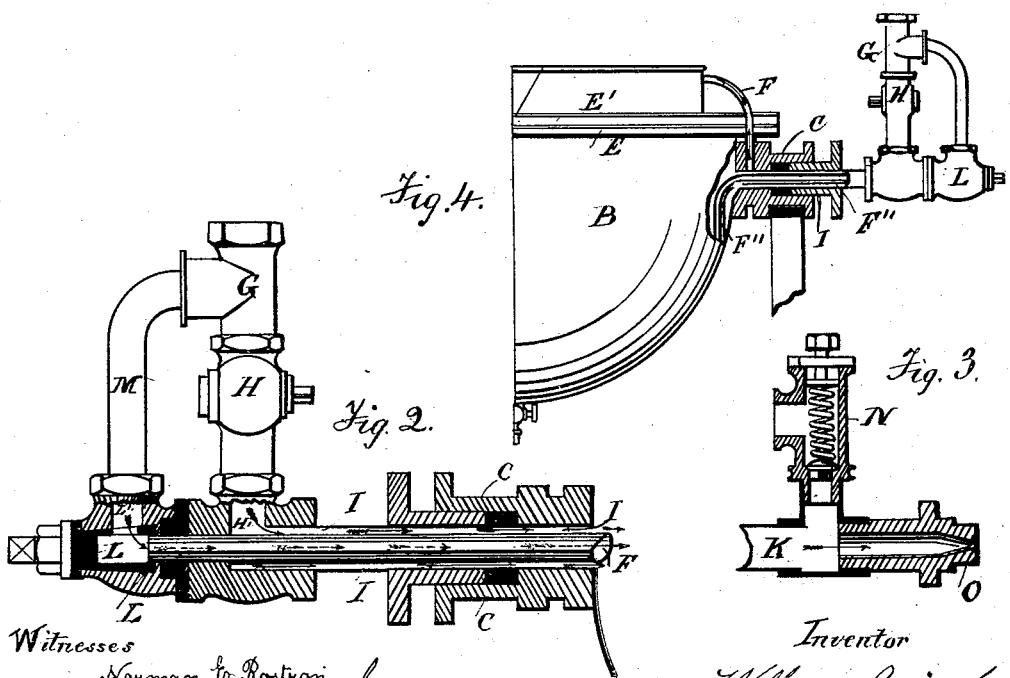
Witnesses
Norman Rostron
Thomas Hawksworth
Inventor
William Brierley

UNITED STATES PATENT OFFICE.

WILLIAM BRIERLEY, OF ROCHDALE, ENGLAND.

CONFECTIONER'S KETTLE.

SPECIFICATION forming part of Letters Patent No. 484,134, dated October 11, 1892.

Application filed March 22, 1892. Serial No. 426,024. (No model.) Patented in England April 23, 1891, No. 6,994.

*To all whom it may concern:*

Be it known that I, WILLIAM BRIERLEY, a subject of the Queen of Great Britain, residing at Rochdale, England, have invented a new and useful Improvement in Apparatus for Boiling or Cooking Sugar for the Manufacture of Sweetmeats, (for which I have obtained a patent in Great Britain, No. 6,994, bearing date April 23, 1891,) of which the following is a specification.

This invention relates to the manufacture of and apparatus for boiling or cooking solutions or compounds of sugar, glucose, or other ingredients used for the manufacture of sweetmeats or confections, which are known in the trade as "boiled goods."

It is well known to persons engaged in the confectionery industry that the sugar undergoes two boiling operations: first, in a steam-jacketed pan or steam-pan, and, secondly, it is transferred from the steam-heated pans to open pans situate on open fires, in order to obtain the proper consistency of the sugar and the requisite heat to attain such consistency. It is of vital importance that the compound be heated to a high temperature, particularly so when the water or moisture is evaporated therefrom, in order that the same may quickly assume a mucilaginous state or attain the proper consistency, so that when cooled or converted into the congealed state it may be hard and of good color, these desirable qualities being necessary, so that the manufactured confections may not become affected for a long period by atmospheric influences, such as heat or moisture, and may not become adhesive or objectionable to manipulate or handle during transport.

The sole object and purpose of my invention, therefore, are to provide an apparatus capable of withstanding and operating with steam at high temperature, which may be as high as 310° Fahrenheit, and means whereby the sugar may be heated or the boiling effected in one and the same pan, and consequently by such means the contents in the pan may be raised to a high degree of temperature, which arrangements hitherto in use have not been capable of withstanding steam at such high temperature as I purpose to employ.

According to my arrangement (hereinafter described) during the process of cooking (when the solution has been sufficiently boiled and the moisture evaporated therefrom) I direct at or about this period into the vessel containing the solution an auxiliary supply of steam at high temperature, by which means the solution speedily attains a high temperature, which is so essential to obtain the beneficial results, as herein described.

I will now explain the process and apparatus by which I accomplish and effect my object, with the aid of the accompanying drawings.

In the drawings, Figure 1 is an elevation, in part section, of my apparatus. Fig. 2 is an enlarged view of a detail showing the steam-inlets or supply portion of the apparatus. Fig. 3 is a view, drawn to an enlarged scale, of a detail showing the steam-outlet portion of my apparatus. Fig. 4 is a sectional elevation of a modification.

I mount on suitable standards or bearings $a$ a pan B, of copper or other suitable material, which vessel is provided in diametrical positions with trunnions C C', but preferably brazed in one piece with the vessel B, which trunnions are seated in their bearings, so as to be free to be turned therein, as is required at the completion of a boiling process, for the purpose of decanting the vessel and pouring the contents onto a slab or table in order to be manipulated for the manufacture of confections. Within the vessel B is situated a corrugated copper boiling-pan D, corrugated in any convenient manner or direction, which corrugated form is essential for the purpose of carrying out my invention, as by its use I am able to obtain greater heating-surface than would be the case with a pan having a plain, regular, or even surface. At the same time I am enabled to combine with greater heating area greater strength or durability, and in practice I find this form to be the most suitable to withstand steam of high temperature or pressure. Between the flange of the vessel D at its upper part and the flange of the outer vessel B are interposed packing-rings E E', and, the vessel D being of less diameter than the vessel B, a space is formed between the vessels D and B. The interior of the boiling-pan is provided with a coil F of suitable form, which is adapted to the form of the pan, one extremity of the said coil extending to the outlet-orifice and the other extremity leading from the steam-supply source, which I will now proceed to describe; also, the relative positions of this supply with the steam-supply to be directed into the space—that is, between the vessels D and B. Steam is allowed to pass through the junction-piece G, and when the valve or cock H is open it is admitted through the orifice I, which orifice throughout its length surrounds the tube F, and from thence out through the outlet-orifice K. When it is desired to direct the steam into the boiling-pan through the medium of the coil F, before referred to, the cock or tap H is closed, and, the cock or tap L being operated or opened, steam is then allowed to pass through the junction-piece M into the coil F, which terminates within the pan at K″ or within the orifice K, a supply of steam being only passed or directed through the said coil periodically, as before stated, when it is required to accelerate the boiling of the solution in the pan in order to attain a high degree of temperature and to complete the boiling, which supply forms an auxiliary or accelerating supply in conjunction with the supply to the jacket. At any convenient part of the outlet-orifice I provide a spring safety-valve N, adapted to allow the steam to escape in the event of attaining a predetermined pressure or maximum limit. I also provide in conjunction with the valve N a nozzle O, having a contracted opening of predetermined size, so as to allow the condensed steam to escape in sufficient quantity without reducing the temperature within the jacket, and thus to assist or aid in the maintenance of the temperature therein. The application of such nozzle with an opening of certain proportions is an important element in the successful accomplishment of my object. The exhaust-steam emitted from the nozzle O may be carried to any desired place and utilized for drying or other necessary purposes. If desired, the steam-accelerating coil may be situated in the jacket, but in that case being suitably perforated, steam being directed against the pan D in the manner and by the means before specified, as illustrated in Fig. 4.

According to the modification illustrated in Fig. 4, the accelerating-coil F″ is passed into the jacket and is preferably perforated. Steam is supplied to the said coil through the medium of the cock L in the manner shown in sectional elevation, Fig. 1, and this only for such period when it is desired to accelerate and increase the temperature for the purposes as before specified. When employing any such arrangement of accelerating-coil within the jacket, I also employ a coil F, Fig. 4, within the boiling-pan, which coil is supplied with steam passing through the orifice I, which supplies the jacket (admitted through the branch piece G and controlled by cock H, as before described) into the tube F, as indicated by arrows.

I am aware that coils have been used in connection with sugar-boiling pans, and I therefore do not claim such combination, broadly; but What I do claim as my invention, and desire to secure by Letters Patent, is—

1. In combination with an inner pan D and outer jacket B, provided with trunnions C, with which the said pan and jacket may at will be rocked together, a coil F within said pan, and means for supplying steam at will to said coil and to the space between the said pan and jacket, substantially as set forth.

2. In an apparatus for boiling or heating sugar, the combination, with an outer and an inner vessel, the latter provided with a steam-coil and being pivotally mounted, of a passage through the journals of said vessel to supply steam to the space between said vessels, a pipe occupying part of said passage and supplying said steam-coil, and valves to check or permit the flow through either supply.

WILLIAM BRIERLEY.

Witnesses:
 NORMAN E. ROSTRON,
 THOMAS HAWKSWORTH.